(12) United States Patent
Gehlert et al.

(10) Patent No.: US 10,951,076 B2
(45) Date of Patent: Mar. 16, 2021

(54) ELECTRIC MACHINES

(71) Applicant: Intelligent Electric Motor Solutions Pty Ltd, Direk (AU)

(72) Inventors: David Brenton Gehlert, St Georges (AU); Matthew Burden Smith, Kensington Gardens (AU); Nesimi Ertugrul, Paradise (AU)

(73) Assignee: INTELLIGENT ELECTRIC MOTOR SOLUTIONS PTY LTD, Direk (AU)

( * ) Notice: Subject to any disclaimer, the term of this patent is extended or adjusted under 35 U.S.C. 154(b) by 42 days.

(21) Appl. No.: 16/322,880

(22) PCT Filed: Aug. 2, 2017

(86) PCT No.: PCT/GB2017/052247
§ 371 (c)(1),
(2) Date: Feb. 1, 2019

(87) PCT Pub. No.: WO2018/025035
PCT Pub. Date: Feb. 8, 2018

(65) Prior Publication Data
US 2019/0273406 A1    Sep. 5, 2019

(30) Foreign Application Priority Data

Aug. 3, 2016  (GB) .................................. 1613419.9
Aug. 3, 2016  (GB) .................................. 1613420.7
Aug. 3, 2016  (GB) .................................. 1613421.5

(51) Int. Cl.
*H02K 1/20* (2006.01)
*H02K 1/14* (2006.01)
(Continued)

(52) U.S. Cl.
CPC ............... *H02K 1/20* (2013.01); *H02K 1/148* (2013.01); *H02K 5/08* (2013.01); *H02K 5/161* (2013.01); *H02K 2213/03* (2013.01)

(58) Field of Classification Search
CPC ............. H02K 1/20; H02K 1/148; H02K 9/19
(Continued)

(56) References Cited

U.S. PATENT DOCUMENTS 5,049,770 A * 9/1991 Gaeth ..................... F02B 63/06
                                                        310/43
7,582,999 B2    9/2009 Atkinson
(Continued)

FOREIGN PATENT DOCUMENTS

CN      102224658      10/2011
CN      102280948      12/2011
(Continued)

OTHER PUBLICATIONS

International Search Report and Written Opinion for International Application No. PCT/GB2017/052247, dated Oct. 17, 2017 (12 pages).
(Continued)

*Primary Examiner* — Thomas Truong
(74) *Attorney, Agent, or Firm* — Sheppard, Mullin, Richter & Hampton LLP (57) ABSTRACT

A stator or rotor for an electric machine such as a motor or generator comprising: at least one ring formed of a plurality of pole segments, wherein each pole segment comprises an arcuate base and at least one magnetisable pole extending radially from the arcuate base; and at least one end cap comprising, or consisting essentially of a non-conductive material.

16 Claims, 6 Drawing Sheets

(51) Int. Cl.
*H02K 5/08* (2006.01)
*H02K 5/16* (2006.01)

(58) Field of Classification Search
USPC .......... 310/52, 54, 58, 59, 216.001–216.137
See application file for complete search history.

(56) References Cited

U.S. PATENT DOCUMENTS

| | | |
|---|---|---|
| 2002/0135254 A1 | 9/2002 | Peachee |
| 2006/0071574 A1 | 4/2006 | Stewart |
| 2009/0134742 A1 | 5/2009 | Rhode |
| 2011/0215660 A1* | 9/2011 | Goto ............. H02K 3/522 310/53 |
| 2012/0074797 A1* | 3/2012 | Petter ............. H02K 1/165 310/51 |
| 2013/0076167 A1* | 3/2013 | Lepres ............. H02K 9/19 310/54 |
| 2013/0147287 A1 | 6/2013 | Lee |
| 2013/0294899 A1* | 11/2013 | Jones ............. H02K 1/20 415/177 |

FOREIGN PATENT DOCUMENTS

| | | |
|---|---|---|
| EP | 1071189 | 1/2001 |
| EP | 1209796 | 5/2002 |
| EP | 1300209 | 4/2003 |
| EP | 1404000 | 3/2004 |
| EP | 1575146 | 9/2005 |
| EP | 1750356 | 2/2007 |
| EP | 2432099 | 3/2012 |
| GB | 2518208 | 3/2015 |
| JP | 2007166681 | 6/2007 |
| JP | 2008029157 | 2/2008 |
| JP | 2009136101 | 6/2009 |
| JP | 2013009543 | 1/2013 |
| JP | 2014121244 | 6/2014 |
| WO | 2009029743 | 3/2009 |
| WO | 2010058284 | 5/2010 |
| WO | 2011009514 | 1/2011 |
| WO | 2011047425 | 4/2011 |
| WO | 2014016802 | 1/2014 |

OTHER PUBLICATIONS

Liew, Gene Shaw et al., An Investigation of Advanced Magnetic Materials for Axial Field Brushless Permanent Magnet Motor Drives for Automotive Applications, IEEE Annual Power Electronics Specialists Conference (2006).
Liew, Gene S. et al., Analysis and Performance Evaluation of an Axial-Field Brushless PM Machine Utilising Soft Magnetic Composites (2007).
Liew, G. S. et al., Analysis of a Segmented Brushless PM Machine Utilising Soft Magnetic Composites, The 33rd Annual Conference of the IEEE Industrial Electronics Society (IECON), Taipei, Taiwan (2007).
Search Report for Great Britain Patent Application No. GB1613421. 5, dated Feb. 23, 2017 (5 pages).
Search Report for Great Britain Patent Application No. GB1613419. 9, dated Feb. 23, 2017 (5 pages).
Search Report for Great Britain Patent Application No. GB1613420. 7, dated Feb. 23, 2017 (4 pages).
Chinese Office Action dated Nov. 3, 2020 for Chinese Application No. 201780061089.4.

* cited by examiner

ELECTRIC MACHINES

CROSS-REFERENCE TO RELATED PATENT APPLICATIONS

This application is a U.S. national stage entry under 35 U.S.C. 371 of International Application No. PCT/GB2017/052247, filed on Aug. 2, 2017, which claims the benefit of priority to Great Britain Patent Application Nos. 1613419.9, 1613420.7, 1613421.5, all filed Aug. 3, 2016. The disclosures of which are incorporated herein by reference in their entirety.

The present invention relates to electric machines, such as motors and generators. The invention also relates to the assembly, manufacture and use of such machines.

Conventionally, stators for electric motors, e.g. brushless DC or AC electric motors, comprise a plurality of laminated steel sheets. The laminated steel sheets are insulated from one another. The laminated steel sheets are punched, annealed and stacked in manufacturing process to form a main stator frame. The main stator frame is typically substantially cylindrical in form and comprises a number of magnetisable pole members. Each pole member has a coil wound around it.

The pressing out of a substantially laminated steel stator frame not only has cost problems associated with the wastage of cut steel, but also may present difficulties for winding coils about the magnetisable pole members of the stator frame.

Alternatively, stators for electric motors can be made using a soft magnetic composite material such as powdered iron.

WO2011/047425 discloses an electric motor having a series of independent stator magnetisable pole members made of soft magnetic composite material, wherein the or each independent stator magnetisable pole member can be placed adjacent to another independent stator magnetisable pole member to provide a cylindrical shape within a housing body; wherein before each individual magnetisable pole member is configured into the cylindrical form, said stator magnetisable pole member is pre-wound with coiling to which current may be passed therethrough.

During operation of an electric motor or generator, undesirable eddy currents can occur, which can have a negative effect on the operation of the motor or generator by disturbing the coupling between the rotor and stator parts. So-called bearing currents can also occur, which can adversely affect the bearings of the rotor/stator. These problems can occur generally irrespective of how and/or from which materials the component parts (rotor or stator) are manufactured.

Therefore, it would be desirable to provide an electric machine and/or component part thereof, in which the effect of undesired eddy currents and/or bearing currents is lessened.

The component parts, e.g. rotor and stator, of such an electric machine, e.g. a motor such as a brushless DC or AC electric motor, typically will heat up, in use. Too great an increase in temperature may result in the affected parts overheating, which may compromise performance or even cause failure of the electric machine. This problem can occur generally irrespective of how and/or from which materials the component parts are manufactured.

Therefore, it would be desirable to provide an electric machine and/or component part thereof, which is less prone to overheating, in use.

Manufacture and/or assembly of component parts, e.g. rotors and stators, of electric machines such as motors or generators can be complicated and time-consuming.

There is an ongoing need for quicker and/or less-complicated and/or more cost-efficient methods of manufacture of such components.

A first aspect of the invention provides a stator or rotor for an electric machine such as a motor or generator comprising: at least one ring formed of a plurality of pole segments, wherein each pole segment comprises an arcuate base and at least one magnetisable pole extending radially from the arcuate base; and at least one end cap comprising, or consisting essentially of, a non-conductive material.

The end cap(s) may overlie axially one or more, e.g. all of, the pole segments in the end ring(s) of the stator or rotor. The end cap may comprise an annular cap or a circular cap. The end cap may be made at least in part from a polymeric material, e.g. a plastic.

Advantageously, the presence of the non-conductive end cap(s) may help to limit the effect of eddy currents at the end stator or rotor windings. In addition, the end cap(s) have been found to mitigate the effects of bearing currents on the pole segments. Consequently, the end cap(s) may allow the stator or rotor or a motor or generator comprising the stator or rotor to be placed in a relatively compact housing, with reduced distances between components and/or resulting in a shorter axial length. In addition, due to the mitigation of the effects of bearing currents, the in-service lifetime of the pole segments and/or bearings may be improved.

In an embodiment, each pole segment may comprise one or more longitudinal channels extending across the base.

Advantageously, the one or more longitudinal channels extending across the base of each of the pole segments may provide, in use, a channel or channels through or along which a cooling fluid can flow. Typically, the cooling fluid may comprise, or consist essentially of, a gas such as air or a liquid such as water. The flow of the cooling fluid along the one or more longitudinal channels extending across the base of the pole segment may be forced, e.g. using a pump or compressor.

Each pole segment may comprise at least one (in some embodiments, up to 10, or more) longitudinal channels extending across the base, e.g. one, two, three, four, five, six, seven, eight, nine or 10 longitudinal channels extending across the base. There may be one or more longitudinal channels per pole of the pole segment.

The one or more longitudinal channels may extend in any generally longitudinal direction across the base. In an embodiment, the longitudinal channel(s) may extend in a direction substantially parallel to a longitudinal axis about which the arcuate base is curved. Alternatively, the longitudinal channel(s) may extend at an angle to the longitudinal axis about which the arcuate base is curved.

The longitudinal channel(s) may be substantially straight or may comprise one or more bends.

One or more of the longitudinal channels may comprise an open channel, e.g. a groove, a slot or a trough, along at least a portion of their length.

Additionally or alternatively, one or more of the longitudinal channels may comprise a closed channel, e.g. a through-hole or aperture, along at least a portion of their length.

In an embodiment, the or each longitudinal channel may comprise a through-hole.

The pole segments may each further comprise a pipe disposed at least partially in the or each longitudinal channel.

The at least one end cap may comprise one or more cap channels for linking in fluid communication with the one or more longitudinal channels of the one or more pole segments.

The one or more cap channels may comprise a lateral cap channel, linking together more than one longitudinal cooling channels. More than one lateral channel may be provided in each end cap. The lateral cap channel may act as a manifold for directing a flow of coolant fluid through the longitudinal channels.

The arcuate base may extend through 180° of arc, 90° of arc, 72° of arc, 60° of arc, 45° of arc, 36° of arc, 30° of arc, 20° of arc or 15° of arc.

In each pole segment, the pole(s) may extend radially inwardly or outwardly from the arcuate base.

Each pole segment may comprise a plurality of poles. Each pole segment may comprise up to 10 poles. Each pole segment may for example comprise one, two, three, four, five, six, seven, eight, nine or 10 poles.

Each pole may have a substantially uniform cross-section along a major portion, e.g. substantially all, of its length.

Each pole segment may comprise a soft magnetic composite material. For instance, the arcuate base and/or the one or more poles may comprise the soft magnetic composite material. The soft magnetic composite material may comprise iron, e.g. powdered iron.

Each pole may comprise a rim located distally from the arcuate base.

Each pole segment may comprise an electrically conducting coil winding around each pole.

In each pole segment, the arcuate base may be provided with at least one location feature such as a keying formation, which may be configured such that a given pole segment can key, in use, with another pole segment, e.g. a similar, or identical, pole segment according to the invention. The location feature(s), e.g. keying formation(s), may enable a given pole segment to key with another pole segment or plurality of pole segments in an axial (longitudinal) direction and/or in the direction of arc (i.e. circumferentially).

Additionally or alternatively, the arcuate base of one or more of the pole segments may be provided with at least one radial location feature. The radial location feature(s) may for example permit, in use, keying with a housing.

In each pole segment, the arcuate base may comprise a groove extending in the direction of arc.

Conveniently, each pole segment may be formed as a single body. Alternatively, for example, the pole(s) may be joined to the arcuate base, e.g. using an adhesive or a mechanical fixing means such as a screw or by a joining technique such as welding, soldering or brazing.

Conveniently, each pole may be formed as a single body. Alternatively, each pole may be formed of a plurality of segments joined together to form the pole, e.g. using an adhesive or a mechanical fixing means such as a screw or by a joining technique such as welding, soldering or brazing.

In an embodiment, the ring(s) may be formed of a plurality of substantially identical pole segments.

In an embodiment, the pole segments may be joined together by any suitable means, e.g. using an adhesive, by welding, by soldering or by brazing. For instance, the pole segments may be joined together by gas metal arc welding (GMAW) (e.g. metal inert gas (MIG) welding or metal active gas (MAG) welding).

In an embodiment, the ring(s) may be disposed within a band, sleeve or housing.

In an embodiment, the stator or rotor may comprise a plurality of rings arranged axially of each other.

Any longitudinal channel(s) extending across the bases of the pole segments in a given ring may be in communication, e.g. fluid communication, with the longitudinal channel(s) extending across the bases of the pole segments in a ring axially adjacent the given ring. Each longitudinal channel extending across the base of a pole segment in a given ring may be in communication, e.g. fluid communication, with one longitudinal channel extending across the base of a pole segment in a ring axially adjacent the given ring.

In a stator or rotor comprising a plurality of rings arranged axially of each other, there may be communication, e.g. fluid communication, between the longitudinal channel(s) extending across the bases of the pole segments in the plurality of rings.

The longitudinal channel(s) extending across the bases of the pole segments in a given ring may be in registry with the longitudinal channel(s) extending across the bases of the pole segments in a ring axially adjacent the given ring. The longitudinal channel(s) extending across the bases of the pole segments may be in registry across two or more, e.g. all, of the plurality of rings.

In embodiments comprising a plurality of rings arranged axially of each other, in which the longitudinal channel(s) across the bases of the pole segments are in registry across two or more of the plurality of rings, one or more pipes may be received at least partially in at least one of the longitudinal channel(s) extending across the base of a given pole segment and at least partially in the longitudinal channel(s) extending across the base of an axially adjacent pole segment. Thus, the pipe(s) may be received at least partially in longitudinal channel(s) extending across the bases of pole segments in at least two, e.g. all, axially adjacent rings.

The longitudinal channel(s) extending across the bases of pole segments may provide, in use, channels through or along which a cooling fluid, e.g. a gas such as air or a liquid, may flow. The cooling fluid may be caused to flow through or along the longitudinal channel(s), e.g. the cooling fluid may be pumped or drawn through or along the longitudinal channel(s).

The longitudinal channel(s) extending across the bases of pole segments may also be useful in fixing together axially adjacent rings of pole segments. For instance, pipes extending from the longitudinal channel(s) extending across the bases of pole segments in a given ring to the longitudinal channel(s) extending across the bases of pole segments in ring that is axially adjacent to the given ring may provide, in use, conduits for a cooling fluid, and may assist in fixing the rings together.

In an embodiment, the or each pipe may act as a locating feature to facilitate keying with a housing. Additionally or alternatively, one or more of the longitudinal channels extending across the bases of the pole segments may act as a locating feature to facilitate keying with a housing.

A second aspect of the invention provides an electric machine such as a motor or a generator comprising a stator or rotor of the first aspect of the invention.

The motor or generator may be a permanent magnet motor or generator. The motor may be a brushless DC or AC electric motor.

A third aspect of the invention provides an apparatus, system or vehicle comprising an electric machine according to the second aspect of the invention.

In an embodiment, the vehicle may comprise a bicycle, a car, a lorry, a motorbike, a train, an aircraft or a marine vessel such as a ship or submarine.

The system may comprise a steering system for a vehicle.

The apparatus may for example comprise a pump.

The apparatus may comprise a wind turbine, with the electric machine being a generator.

A fourth aspect of the invention provides a method of manufacture or assembly of a stator or rotor for an electric machine comprising: arranging a plurality of pole segments comprising an arcuate base and at least one magnetisable pole extending radially from the arcuate base such that the arcuate bases of the pole segments form at least one ring; and placing on at least one end of the stator or rotor an end cap comprising, or consisting essentially of, a non-conductive material.

A fifth aspect of the invention provides a pole segment for a stator or rotor of an electric motor or generator, the pole segment comprising: an arcuate base; one or more magnetisable poles extending radially from the arcuate base; and one or more longitudinal channels extending across the base.

In a sixth aspect, a magnet carrying segment is provided for a stator or rotor of an electric motor or generator, the magnet carrying segment comprising: an arcuate base for carrying one or more permanent magnets. The segment may comprise one or more recesses, each recess for receiving at least part of a magnet. Features described with reference to a pole segment may also be applied to the magnet carrying segment.

Advantageously, the one or more longitudinal channels extending across the base of the pole segment may provide, in use, a channel or channels through or along which a cooling fluid can flow. Typically, the cooling fluid may comprise, or consist essentially of, a gas such as air or a liquid such as water. The flow of the cooling fluid along the one or more longitudinal channels extending across the base of the pole segment may be forced, e.g. using a pump or compressor.

The pole segment may comprise at least one (in some embodiments, up to 10, or more) longitudinal channels extending across the base, e.g. one, two, three, four, five, six, seven, eight, nine or 10 longitudinal channels extending across the base. There may be one or more longitudinal channels per pole of the pole segment.

The one or more longitudinal channels may extend in any generally longitudinal direction across the base. In an embodiment, the longitudinal channel(s) may extend in a direction substantially parallel to a longitudinal axis about which the arcuate base is curved. Alternatively, the longitudinal channel(s) may extend at an angle to the longitudinal axis about which the arcuate base is curved.

The longitudinal channel(s) may be substantially straight or may comprise one or more bends.

One or more of the longitudinal channels may comprise an open channel, e.g. a groove, a slot or a trough, along at least a portion of their length.

Additionally or alternatively, one or more of the longitudinal channels may comprise a closed channel, e.g. a through-hole or aperture, along at least a portion of their length.

In an embodiment, the or each longitudinal channel may comprise a through-hole.

The pole segment may further comprise a pipe disposed at least partially in the or each longitudinal channel.

For example, the arcuate base may extend through 180° of arc, 90° of arc, 72° of arc, 60° of arc, 45° of arc, 36° of arc, 30° of arc, 20° of arc or 15° of arc.

The pole(s) may extend radially inwardly or outwardly from the arcuate base.

The pole segment may comprise a plurality of poles. The pole segment may comprise more than one pole (e.g. up to 10). The pole segment may for example comprise one, two, three, four, five, six, seven, eight, nine or 10 poles (or more than 10).

Each pole may have a substantially uniform cross-section along a major portion, e.g. substantially all, of its length.

The pole segment may comprise a soft magnetic composite material. For instance, the arcuate base and/or the one or more poles may comprise the soft magnetic composite material. The soft magnetic composite material may comprise iron, e.g. powdered iron.

The or each pole may comprise a rim located distally from the arcuate base.

The pole segment may comprise an electrically conducting coil winding around each pole.

The arcuate base may be provided with at least one location feature such as a keying formation, which may be configured such that the pole segment can key, in use, with another pole segment, e.g. a similar, or identical, pole segment according to the invention. The location feature(s), e.g. keying formation(s), may enable the pole segment to key with another pole segment or plurality of pole segments in an axial (longitudinal) direction and/or in the direction of arc (i.e. circumferentially).

Additionally or alternatively, the arcuate base may be provided with at least one radial location feature. The radial location feature(s) may for example permit, in use, keying with a housing.

The arcuate base may comprise a groove extending in the direction of arc.

In an embodiment, the pole segment may be formed as a single body. Alternatively, for example, the pole(s) may be joined to the arcuate base, e.g. using an adhesive or a mechanical fixing means such as a screw or by a joining technique such as welding, soldering or brazing.

The or each pole may be formed as a single body. Alternatively, the or each pole may be formed of a plurality of segments joined together to form the pole(s), e.g. using an adhesive or a mechanical fixing means such as a screw or by a joining technique such as welding, soldering or brazing.

A seventh aspect of the invention provides a stator or rotor for an electric machine comprising a plurality of pole segments of the fifth aspect of the invention, wherein the pole segments are arranged such that the arcuate bases of the pole segments form at least one ring.

An eighth aspect of the invention provides a stator or rotor for an electric machine comprising a plurality of magnet carrying segments of the sixth aspect of the invention, wherein the magnet carrying segments are arranged such that the arcuate bases of the magnet carrying segments form at least one ring.

In an embodiment, the ring(s) may be formed of a plurality of substantially identical pole segments.

In an embodiment, the pole segments may be joined together by any suitable means, e.g. using an adhesive, by welding, by soldering or by brazing. For instance, the pole segments may be joined together by gas metal arc welding (GMAW) (e.g. metal inert gas (MIG) welding or metal active gas (MAG) welding).

In an embodiment, the ring(s) may be disposed within a band, sleeve or housing.

In an embodiment, the stator or rotor may comprise a plurality of rings arranged axially of each other.

The longitudinal channel(s) extending across the bases of the pole segments in a given ring may be in communication, e.g. fluid communication, with the longitudinal channel(s) extending across the bases of the pole segments in a ring axially adjacent the given ring. Each longitudinal channel extending across the base of a pole segment in a given ring may be in communication, e.g. fluid communication, with one longitudinal channel extending across the base of a pole segment in a ring axially adjacent the given ring.

In a stator or rotor comprising a plurality of rings arranged axially of each other, there may be communication, e.g. fluid communication, between the longitudinal channel(s) extending across the bases of the pole segments in the plurality of rings.

The longitudinal channel(s) extending across the bases of the pole segments in a given ring may be in registry with the longitudinal channel(s) extending across the bases of the pole segments in a ring axially adjacent the given ring. The longitudinal channel(s) extending across the bases of the pole segments may be in registry across two or more, e.g. all, of the plurality of rings.

In embodiments comprising a plurality of rings arranged axially of each other, in which the longitudinal channel(s) across the bases of the pole segments are in registry across two or more of the plurality of rings, one or more pipes may be received at least partially in at least one of the longitudinal channel(s) extending across the base of a given pole segment and at least partially in the longitudinal channel(s) extending across the base of an axially adjacent pole segment. Thus, the pipe(s) may be received at least partially in longitudinal channel(s) extending across the bases of pole segments in at least two, e.g. all, axially adjacent rings.

The longitudinal channel(s) extending across the bases of pole segments may provide, in use, channels through or along which a cooling fluid, e.g. a gas such as air or a liquid, may flow. The cooling fluid may be caused to flow through or along the longitudinal channel(s), e.g. the cooling fluid may be pumped or drawn through or along the longitudinal channel(s).

The longitudinal channel(s) extending across the bases of pole segments may also be useful in fixing together axially adjacent rings of pole segments. For instance, pipes extending from the longitudinal channel(s) extending across the bases of pole segments in a given ring to the longitudinal channel(s) extending across the bases of pole segments in ring that is axially adjacent to the given ring may provide, in use, conduits for a cooling fluid, and may assist in fixing the rings together.

In an embodiment, the stator or rotor may comprise at least one end cap comprising, or consisting essentially of, a non-conductive material. The end cap(s) may overlie axially one or more, e.g. all of, the pole segments in the end ring(s) of the stator. The end cap may comprise an annular cap or a circular cap. The end cap may be made at least in part from a polymeric material, e.g. a plastic.

Advantageously, the presence of the non-conductive end cap(s) may help to limit the effect of eddy currents at the end stator or rotor windings. In addition, the end cap(s) have been found to mitigate the effects of bearing currents. Consequently, the end cap(s) may allow the stator or rotor or a motor or generator comprising the stator or rotor to be placed in a relatively compact housing, with reduced distances between components and/or resulting in a shorter axial length. In addition, due to the mitigation of the effects of bearing currents, the in-service lifetime of the pole segments and/or bearings may be improved.

The at least one end cap may comprise one or more cap channels for linking in fluid communication with the one or more longitudinal channels of the one or more pole segments.

The one or more cap channels may comprise a lateral cap channel, linking together more than one longitudinal cooling channels. More than one lateral channel may be provided in each end cap. The lateral cap channel may act as a manifold for directing a flow of coolant fluid through the longitudinal channels.

In an embodiment, the or each pipe may act as a locating feature to facilitate keying with a housing. Additionally or alternatively, one or more of the longitudinal channels extending across the bases of the pole segments may act as a locating feature to facilitate keying with a housing.

A ninth aspect of the invention provides an electric machine such as a motor or a generator comprising a stator or rotor of the seventh or eighth aspect of the invention.

The motor or generator may be a permanent magnet motor or generator. The motor may be a brushless DC or AC electric motor.

A tenth aspect of the invention provides an apparatus, system or vehicle comprising an electric machine according to the ninth aspect of the invention.

In an embodiment, the vehicle may comprise a bicycle, a car, a lorry, a motorbike, a train, an aircraft or a marine vessel such as a ship or submarine.

The system may comprise a steering system for a vehicle.

The apparatus may for example comprise a pump.

The apparatus may comprise a wind turbine, with the electric machine being a generator.

An eleventh aspect of the invention provides a method of manufacture or assembly of a stator or rotor for an electric machine comprising: arranging a plurality of pole segments of the fifth aspect of the invention such that the arcuate bases of the pole segments form at least one ring.

A twelfth aspect of the invention provides a method of manufacture or assembly of a stator or rotor for an electric machine comprising: arranging a plurality of magnet carrying segments of the sixth aspect of the invention such that the arcuate bases of the magnet carrying segments form at least one ring.

A thirteenth aspect of the invention provides a method of manufacture of a segment for a stator or rotor of an electric motor or generator comprising:

providing a soft magnetic composite powder in a green state;

placing the soft magnetic composite powder in the green state in a mould having the desired shape and dimensions of the segment, wherein the desired shape and dimensions of the segment comprise an arcuate base and at least one pole extending radially from the arcuate base or at least one recess for receiving a permanent magnet;

pressing the soft magnetic composite powder within the mould to form a monolithic pole segment having the desired shape and dimensions.

The segment may be a magnet carrying segment for use as part of a permanent magnet rotor or stator. The segment may be a pole stator, for use as part of a wound rotor or stator. The magnet carrying segment may comprise at least one recess, or may, in some embodiments, omit the recess.

The method may comprise attaching at least one permanent magnet to the magnet carrying segment. Each permanent magnet may be located at least partly within a recess.

Advantageously, the method provides for quicker and less-complicated manufacture of a segment. This applies in embodiments relating to permanent magnet segments and wound segments. Features and advantages mentioned below with reference to a pole segment are also applicable to permanent magnet segments.

Pole segments made according to the method of this invention have been found to have acceptable mechanical and physical properties for use in rotors or stators of electric machines such as motors or generators. Such acceptable mechanical and physical properties may be more difficult to achieve if attempting to manufacture, for example, a complete stator ring from a soft magnetic composite material, as opposed to individual pole segments that can then be assembled into a stator ring.

Another advantage of producing individual, modular pole segments is that it may be simpler to place conducting coil windings around the magnetisable pole(s) of individual, modular pole segments than around the magnetisable poles of a fully-assembled rotor or stator. Such a method can also increase the copper fill factor to a degree not easily achievable in laminated structures.

The soft magnetic composite material may comprise iron, e.g. powdered iron.

The segment may further comprise one or more longitudinal channels extending across the base.

Advantageously, the one or more longitudinal channels extending across the base of the segment may provide, in use, a channel or channels through or along which a cooling fluid can flow. Typically, the cooling fluid may comprise, or consist essentially of, a gas such as air or a liquid such as water. The flow of the cooling fluid along the one or more longitudinal channels extending across the base of the segment may be forced, e.g. using a pump or compressor.

The pole segment may comprise at least one (in some embodiments, up to 10, or more) longitudinal channels extending across the base, e.g. one, two, three, four, five, six, seven, eight, nine or 10 longitudinal channels extending across the base. There may be one or more longitudinal channels per pole of the pole segment.

The one or more longitudinal channels may extend in any generally longitudinal direction across the base. In an embodiment, the longitudinal channel(s) may extend in a direction substantially parallel to a longitudinal axis about which the arcuate base is curved. Alternatively, the longitudinal channel(s) may extend at an angle to the longitudinal axis about which the arcuate base is curved.

The longitudinal channel(s) may be substantially straight or may comprise one or more bends.

One or more of the longitudinal channels may comprise an open channel, e.g. a groove, a slot or a trough, along at least a portion of their length.

Additionally or alternatively, one or more of the longitudinal channels may comprise a closed channel, e.g. a through-hole or aperture, along at least a portion of their length.

In an embodiment, the or each longitudinal channel may comprise a through-hole.

The segment may further comprise a pipe disposed at least partially in the or each longitudinal channel.

For example, the arcuate base may extend through 180° of arc, 90° of arc, 72° of arc, 60° of arc, 45° of arc, 36° of arc, 30° of arc, 20° of arc or 15° of arc.

The pole(s) may extend radially inwardly or outwardly from the arcuate base.

The pole segment may comprise a plurality of poles. The pole segment may comprise more than one pole (e.g. up to 10). The pole segment may for example comprise one, two, three, four, five, six, seven, eight, nine or 10 poles (or more than 10).

Each pole may have a substantially uniform cross-section along a major portion, e.g. substantially all, of its length.

The or each pole may comprise a rim located distally from the arcuate base.

The method may comprise the subsequent step of placing, e.g. by winding, an electrically conducting coil winding around each pole. In some embodiments, the or each electrically conducting coil winding may be pre-wound before being placed around the or each pole.

The arcuate base may be provided with at least one location feature such as a keying formation, which may be configured such that the segment can key, in use, with another segment, e.g. a similar, or identical, segment according to the invention. The location feature(s), e.g. keying formation(s), may enable the segment to key with another segment or plurality of pole segments in an axial (longitudinal) direction and/or in the direction of arc (i.e. circumferentially).

Additionally or alternatively, the arcuate base may be provided with at least one radial location feature. The radial location feature(s) may for example permit, in use, keying with a housing.

The arcuate base may comprise a groove extending in the direction of arc.

A fourteenth aspect of the invention provides a stator or rotor for an electric machine comprising a plurality of segments manufactured in accordance with the thirteenth aspect of the invention, wherein the pole segments are arranged such that the arcuate bases of the segments form at least one ring.

A fifteenth aspect of the invention provides a method of assembly of a stator or rotor for an electric machine comprising: providing a plurality of segments manufactured in accordance with the thirteenth aspect of the invention; and arranging the segments such that the arcuate bases of the segments form at least one ring.

In an embodiment, the ring(s) may be formed of a plurality of substantially identical segments.

In an embodiment, the segments may be joined together by any suitable means, e.g. using an adhesive, by welding, by soldering or by brazing. For instance, the pole segments may be joined together by gas metal arc welding (GMAW) (e.g. metal inert gas (MIG) welding or metal active gas (MAG) welding)

In an embodiment, the ring(s) may be disposed within a band, sleeve or housing.

In an embodiment, the stator or rotor may comprise a plurality of rings arranged axially of each other.

Any longitudinal channel(s) extending across the bases of the segments in a given ring may be in communication, e.g. fluid communication, with the longitudinal channel(s) extending across the bases of the segments in a ring axially adjacent the given ring. Each longitudinal channel extending across the base of a segment in a given ring may be in communication, e.g. fluid communication, with one longitudinal channel extending across the base of a segment in a ring axially adjacent the given ring.

In a stator or rotor comprising a plurality of rings arranged axially of each other, there may be communication, e.g. fluid communication, between the longitudinal channel(s) extending across the bases of the segments in the plurality of rings.

The longitudinal channel(s) extending across the bases of the segments in a given ring may be in registry with the longitudinal channel(s) extending across the bases of the segments in a ring axially adjacent the given ring. The longitudinal channel(s) extending across the bases of the segments may be in registry across two or more, e.g. all, of the plurality of rings.

In embodiments comprising a plurality of rings arranged axially of each other, in which the longitudinal channel(s)

across the bases of the segments are in registry across two or more of the plurality of rings, one or more pipes may be received at least partially in at least one of the longitudinal channel(s) extending across the base of a given segment and at least partially in the longitudinal channel(s) extending across the base of an axially adjacent segment. Thus, the pipe(s) may be received at least partially in longitudinal channel(s) extending across the bases of segments in at least two, e.g. all, axially adjacent rings.

The longitudinal channel(s) extending across the bases of segments may provide, in use, channels through or along which a cooling fluid, e.g. a gas such as air or a liquid, may flow. The cooling fluid may be caused to flow through or along the longitudinal channel(s), e.g. the cooling fluid may be pumped or drawn through or along the longitudinal channel(s).

The longitudinal channel(s) extending across the bases of segments may also be useful in fixing together axially adjacent rings of segments. For instance, pipes extending from the longitudinal channel(s) extending across the bases of segments in a given ring to the longitudinal channel(s) extending across the bases of segments in ring that is axially adjacent to the given ring may provide, in use, conduits for a cooling fluid, and may assist in fixing the rings together.

In an embodiment, the stator or rotor may comprise at least one end cap comprising, or consisting essentially of, a non-conductive material. The end cap(s) may overlie axially one or more, e.g. all of, the pole segments in the end ring(s) of the stator. The end cap may comprise an annular cap or a circular cap. The end cap may be made at least in part from a polymeric material, e.g. a plastic.

Advantageously, the presence of the non-conductive end cap(s) may help to limit the effect of eddy currents at the end stator or rotor windings. In addition, the end cap(s) have been found to mitigate the effects of bearing currents. Consequently, the end cap(s) may allow the stator or rotor or a motor or generator comprising the stator or rotor to be placed in a relatively compact housing, with reduced distances between components and/or resulting in a shorter axial length. In addition, due to the mitigation of the effects of bearing currents, the in-service lifetime of the pole segments and/or bearings may be improved.

The at least one end cap may comprise one or more cap channels for linking in fluid communication with the one or more longitudinal channels of the one or more pole segments.

The one or more cap channels may comprise a lateral cap channel, linking together more than one longitudinal cooling channels. More than one lateral channel may be provided in each end cap. The lateral cap channel may act as a manifold for directing a flow of coolant fluid through the longitudinal channels.

In an embodiment, the or each pipe may act as a locating feature to facilitate keying with a housing. Additionally or alternatively, one or more of the longitudinal channels extending across the bases of the pole segments may act as a locating feature to facilitate keying with a housing.

A sixteenth aspect of the invention provides an electric machine such as a motor or a generator comprising a stator or rotor according to the fourteenth aspect of the invention or comprising a stator or rotor assembled according to the fifteenth aspect of the invention.

The motor or generator may be a permanent magnet motor or generator. The motor may be a brushless DC or AC electric motor.

A seventeenth aspect of the invention provides an apparatus, system or vehicle comprising an electric machine according to the sixteenth aspect of the invention.

In an embodiment, the vehicle may comprise a bicycle, a car, a lorry, a motorbike, a train, an aircraft or a marine vessel such as a ship or submarine.

The system may comprise a steering system for a vehicle.

The apparatus may for example comprise a pump.

The apparatus may comprise a wind turbine, with the electric machine being a generator.

Embodiments of the invention will now be described, purely by way of example, with reference to the accompanying drawings, in which.

Embodiments of the present invention are applicable to generators as well as motors, and embodiments and features described with reference to a motor in this disclosure will be understood as also relating to a generator. Similarly, it should also be understood that parts of the description that relate to a stator are equally applicable to a rotor (e.g. a wound rotor) for a motor or generator.

Figure 1:
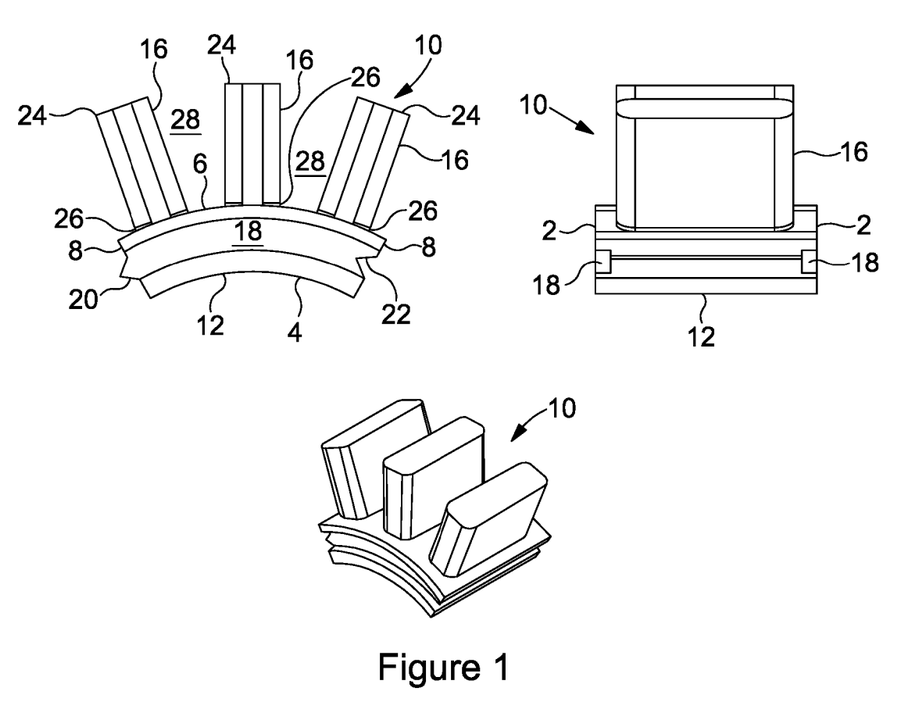
FIG. 1 is an end view, side view and angled view of a pole segment according to a first embodiment.

FIG. 1 shows a pole segment 10, comprising radial poles 16 and a base 12. The base 12 is arcuate, and is curved about a longitudinal axis (which forms the axis of rotation of an assembled motor comprising the pole segment). The base 12 comprises an inner face 4 (facing the longitudinal axis), an opposite outer face 6, end faces 2 that are normal to the longitudinal axis and radial faces 8. A groove 18 is provided in each end face 2, each groove 18 for receiving a circlip. A radial face 8 at one end of the base 12 is provided with a male location feature 20, and a radial face 8 at the other end of the base 12 is provided with a corresponding female location feature 22. The term 'corresponding' in this context means that the female location feature 22 is configured to receive an identical further male location feature 20 (e.g. of a further pole segment 10).

The poles 16 are each fixed to the base 12 at their root 26 and extend radially away from the longitudinal axis between the root 26 and the distal tip 24 of each pole 16. Each pole 16 is substantially rectangular in cross section (viewed from tip 24 to root 26), having rounded edges. Winding spaces 28 are provided between each pole 16, for accommodating a winding (not shown in FIG. 1).

In the example of FIG. 1, the cross section of each pole 16 is substantially constant between the root 26 and distal tip 24. This allows a pre-wound winding to be slipped over the pole 16 (which may be retained in place by subsequent potting of the resulting assembly (i.e. at least partial encapsulation by a solid compound, such as an epoxy resin), or by any other method (for example by applying an end cap, which end cap may be non-magnetic, to the pole 16).

In other examples, the cross section of the pole 16 may vary. For example, the distal tip 24 may have a larger extent than the middle portion of the pole 16, and the distal tip may end in an arcuate face (curved about the longitudinal axis), so as to improve magnetic coupling with a rotor adjacent to the distal tip 24.

The extent of each pole 16 in the longitudinal direction may be smaller than the extent of the base 12 in the same direction, for instance to accommodate an indented winding about each pole 16.

In this example, the pole segment 10 comprises three poles 16 attached to the base 12. In other embodiments the pole segment 10 may include only a single pole 16, or may have a different number of poles 16, such as 2, 4, 5, or more.

In this example, the poles 16 are each fixed to the outer face of the pole segment 10, with the distal tip 24 being radially outward from the root 26 (i.e. the poles 16 face outwards). In other embodiments the poles 16 may be fixed to the inner face of the pole segment 10, with the distal tip 24 being radially inward from the root 26 (i.e. the poles 16 may face inwards).

A pole segment 10 with inward facing poles 16 may be suitable for use as part of an external stator (with a rotor inside the stator). A pole segment 10 with outward facing poles 16 may be suitable for use as part of an internal stator (with a rotor outside the stator). A motor with an internal stator and an external rotor may have reduced back iron, resulting in reduced rotor loss and improved efficiency.

An electric machine according to an embodiment may comprise a stator and a permanent magnet rotor. The permanent magnet rotor may comprise a ring of bonded permanent magnets, for disposing adjacent to the outside of the stator (the magnets attached to the rotor facing inwards).

A plurality of pole segments 10 may be assembled to form a complete stator (or rotor) body. In some embodiments, a complete stator body may be formed from a plurality of identical pole segments 10 in a polar array about a longitudinal axis, which may simplify manufacturing and reduce cost.

Each pole segment 10 may be a monolithic element, rather than being assembled from a plurality of components. The pole segment may be formed from a soft magnetic composite (SMC) for instance by pressing or compacting a powder into a green part, and then heating the green part, for instance to cure a binder material. The powder may comprise a soft magnetic material (e.g. comprising iron) and a binder material for forming a matrix with low electrical conductivity. The pole segment may be a monolithic SMC part (e.g. formed from a single pressing of SMC material). This simplifies manufacturing and reduces the cost of an electric machine comprising the pole segment 10.

In other embodiments, the pole segment 10 may comprise an assembly of parts (which may each comprise SMC material) that are fixed together. Pressing of an SMC part may become more challenging when the part size is relatively large, so it may sometime be appropriate to assemble a larger part (such as a pole segment) from smaller subcomponents. In some embodiments, each pole 16 may comprise a first and second SMC part that are fixed together, for instance being stacked in a radial direction to provide a relatively long pole in the radial direction, or stacked in the longitudinal direction, to produce a relatively long pole in the axial direction. SMC parts may be fixed together in any way, for instance by adhesive bonding, using fasteners, mounting to a sub-frame etc.

Figure 2:
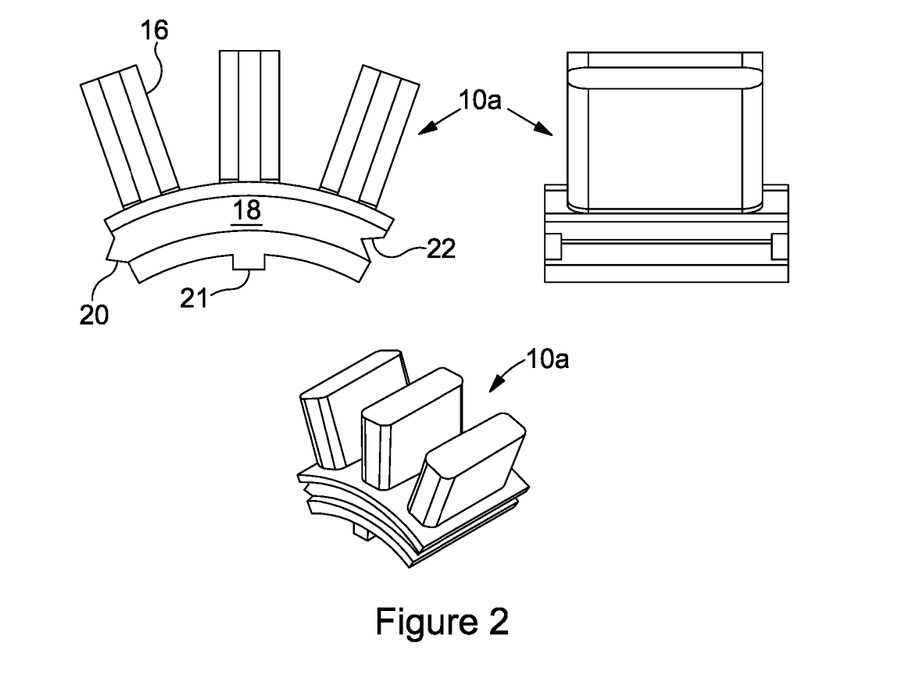
FIG. 2 is an end view, side view and angled view of a pole segment according to a second embodiment.

FIG. 2 shows a pole segment 10a that is similar to the pole segment 10 of FIG. 1, but which also includes a location feature 21 on the inner face of the pole segment 10, for fixing the pole segment 10 relative to a further part. In this example, the location feature 21 is male, in the form of a protruding ridge, but the location feature 21 could alternatively be female, comprising a groove, slot or recess in the pole segment. The location feature 21 is configured to be received in (or receive, depending on whether the location feature is male or female) a corresponding location feature of the further part, which may be part of a motor/generator housing.

Figure 3:
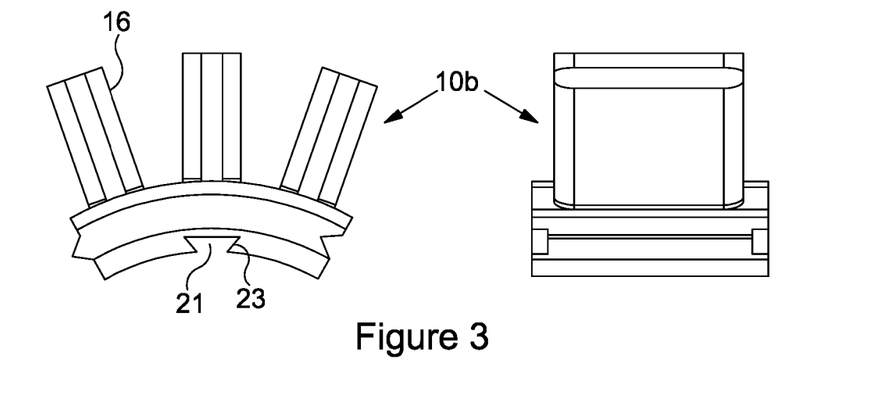
FIG. 3 is an end view and side view of a pole segment according to a third embodiment.

FIG. 3 shows a pole segment 10b that is similar to the pole segment 10 of FIG. 1, which also includes a female location feature 21 on the inner face of the pole segment 10, for fixing the pole segment 10 relative to a further part. The female location feature 21 in this embodiment comprises a dovetail shape, with tapering edges.

The pole segments 10 may be insulated ready for winding. A suitable insulating layer or paint (comprising GF 300 silicone elastomers) may be applied to insulate the winding space 28 (i.e. the portions of the pole segment 10 that may come into contact with the winding). One way to apply an insulating layer is to dip each pole segment into a suitable insulating material. Alternatively the insulating layer may be applied with a brush or by spraying onto the pole segment 10. Some of the surfaces of the pole segment 10 may be masked, such as the faces that contact other pole segments during assembly, before the insulating layer is applied.

Figure 14:
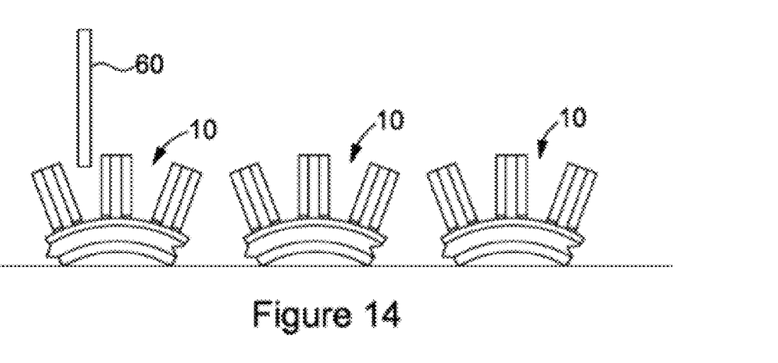
FIG. 14 is an illustration of a winding operation being carried out on pole segments that are arranged side-by-side.

An alternative method for providing an insulating layer is to provide a relatively thin insulating former (which may be flexible), that substantially conforms to the surface of the pole segment 10 in the region of the winding space 28. At least one insulating former may be provided for each pole segment 10. In some embodiments an insulating former may be provided in two halves, abutting along a longitudinal edge of the insulating formers. In other embodiments, a single insulating former may be provided for the assembled stator (or rotor). The insulating former may be used to support pole segments during a winding operation, for instance in an un-rolled or side by side configuration, as shown in FIG. 14.

Figure 4:
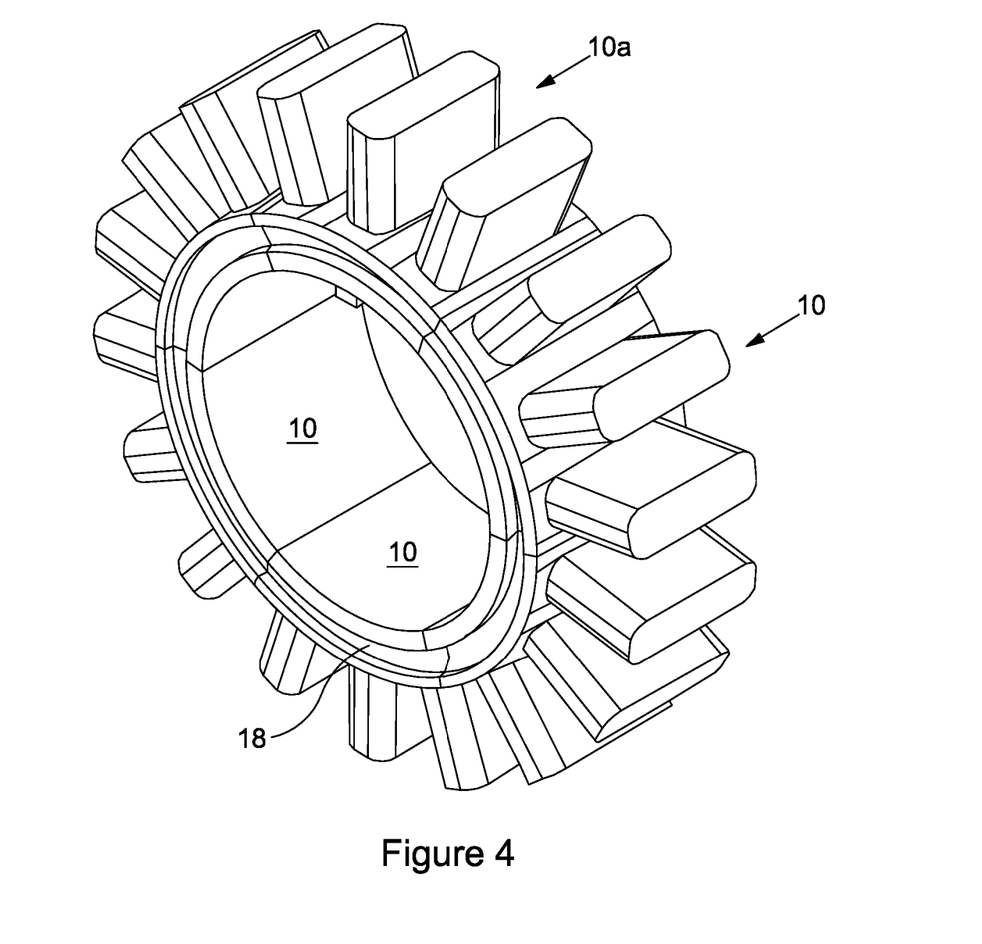
FIG. 4 is a view of an assembled stator according to an embodiment.
Figure 5:
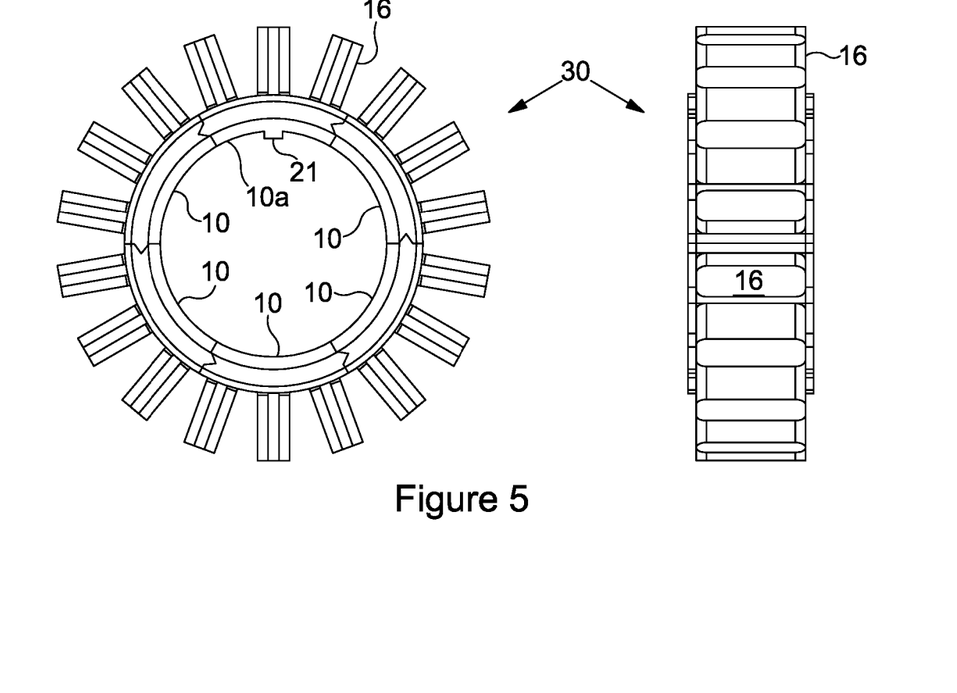
FIG. 5 is an end view and a side view of the assembled stator of FIG. 4.

FIGS. 4 and 5 show a complete stator body 30, comprising five pole segments 10 as shown in FIG. 1, and one pole segment 10a as shown in FIG. 2 (for a total of 6×3=18 poles). In alternative arrangements, the stator body 30 may comprise a plurality of identical pole segments 10a (or 10b), each having a location feature 21 (or location feature 21 in FIG. 3). The male location feature 20 on the radial face of each pole segment 10, 10a is received in the corresponding female location feature 22 of the adjacent pole segment 10, 10a.

One way to wind pole segments 10 is to place the pole segments with the poles 16 facing in substantially the same direction, for example, by placing the pole segments on a substantially flat surface with the poles facing upwards (e.g. side by side). This facilitates more straightforward winding of the poles, as indicated schematically in FIG. 14, which shows a winding tool 60 ready to wind poles 16 of the three pole segments 10. All the poles 16 of a stator may be wound together in this way using a winding machine working from the top. Optionally, the winding may be a three phase winding (with all phases wound at the same time. The wound pole segments 10 may subsequently be fixed together to form the stator body 30.

Alternatively, the pole segments 10 may be arranged around a cylindrical mount, and then each pole 16 may be wound in sequence: i.e. by locating a pole 16 in a winding position, winding a pole 16, and rotating/indexing the mount to locate another pole 16 in the winding position. Winding the poles 16 in this way may avoid the need to join together the individual windings of each phase of the stator.

In some embodiments, windings may be formed as pre-wound individual coils. The individual coils may be linked manually to form a three phase winding and the winding may be potted together with the stator to hold the winding in place.

In some embodiments an entire three phase winding can be done by a winding machine in one winding operation, reducing the number of joints in the winding. Again, the winding may be potted together with the stator.

In some embodiments individual coils can be electrical coupled together using a preformed bus bar arrangement or using a PCB (printed circuit board) structure.

The winding may comprise round cross section wires, or square cross section wires, which may result in a higher ratio of conductor to void space in the winding.

One way to fix the pole segments 10 together (whether they have already been wound or not), is to use a circlip or other retaining member in at least one of the grooves 18. Alternatively or additionally, the pole segments 10 may be bonded together using adhesive or the like. Where the pole segments 10 face inwards, they may be retained in an assembled (circular) configuration by an interference fit within a housing. Conveniently, an interference fit may be obtained by heating the housing before the stator is inserted, to create a clearance fit which turns into an interference fit once the housing has cooled back to ambient temperature.

The applicant has found that metal inert gas (MIG) welding may be used to join together the pole segments. Furthermore, the pole segments joined together by MIG welding may be made from an SMC material comprising iron. For instance, where the pole segments face inwards (i.e. with the pole(s) extending radially inwards), the pole segments may be welded together from behind (i.e. from the outer face). Conveniently, the edges of the outer face of each pole segment may be at least partially bevelled such that the bevelling on adjacent pole segments together form a recess for receiving a weld pool. Thus, by selecting appropriate welding parameters, the pole segments may be joined together in such a way that the outer surface of the ring formed from the welded-together pole segments is still smooth enough to insert the ring into a closely-fitting housing. The housing may be made from a plastic or a metal. Alternatively, after welding the outer surface of the ring formed from the welded-together pole segments may not be smooth, e.g. because the weld protrudes from the outer surface or because there is a depression at the weld, in which case the protrusions or depressions at the welds may help to locate the ring in the housing and prevent rotation, in use, of the ring in the housing. Welding the pole segments together may be relatively quick, e.g. as compared with using adhesive, and/or may be well suited for use in an automated assembly process.

Figure 6:
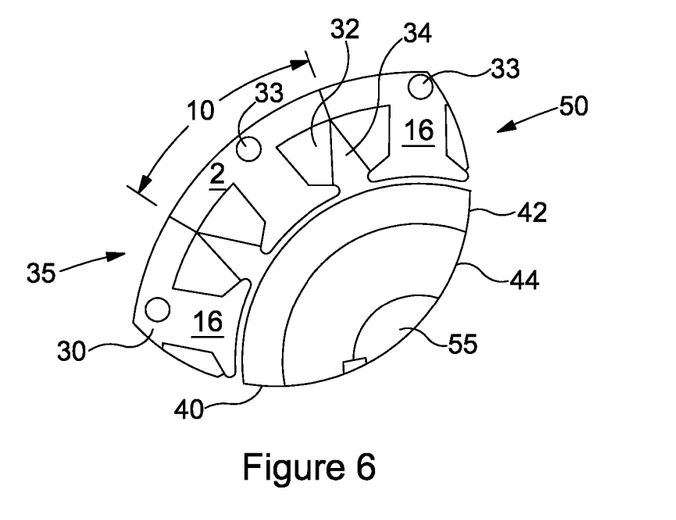
FIG. 6 is a detail sectional view of a motor according to an embodiment, in which each stator segment comprises a longitudinal cooling channel.

FIG. 6 illustrates a portion of a motor (or a generator) 50 with an external stator 35. The stator 35 includes a stator body 30 comprising a plurality of pole segments 10, with windings 32 around each pole 16. The stator 35 of FIG. 6 is an external stator, with the poles 16 facing inwards towards a rotor 40. The rotor is a permanent magnet rotor 40, comprising a ring of permanent magnet elements 42. The poles 16 in the example of FIG. 6 further comprise flared capping features at the distal tip, which both serve to aid in retaining the windings, and improve magnetic coupling to the magnets 42 of the rotor 40.

There is back iron 44 behind the magnets 42. The back iron 44 may comprise, or consist essentially of, a soft magnetic composite (SMC) material. SMC may be used as back iron to reduce rotor losses. The rotor 40 is fixed to a shaft 55.

One problem with motors is heat dissipation: motors can be prone to overheating. This is addressed in the embodiment of FIG. 6 by providing two features for improving heat loss. Firstly, a winding void 34 is provided between each adjacent wound coil 32. Secondly, a cooling channel 33 is provided through each pole segment 10. These features can be used independently, as well as in combination. In the example of FIG. 6, the cooling channel 33 comprises a longitudinal channel, with an opening in each end face 2 of the pole segment 10, and a fluid conduit defined by a hole through the material of the pole segment 10 therebetween.

The cooling channel 33 is conveniently substantially parallel with the longitudinal axis, but may be at an angle, or take a curved or tortuous path through the pole segment 10 (which may improve the surface area for interaction with the cooling fluid).

The cooling channel 33 in FIG. 6 is substantially circular in cross section, but other shapes may also be used (e.g. square, etc.). In use, a fluid (e.g. air) may be drawn through the cooling channels 33 to transport heat away from the stator 35. In some embodiments, the motor may be arranged so that rotation of the motor drives air through the cooling channels 33. As already mentioned, the stator 35 may be potted, and the cooling channels 33 may provide an important mechanism for rejecting heat.

Figure 7:
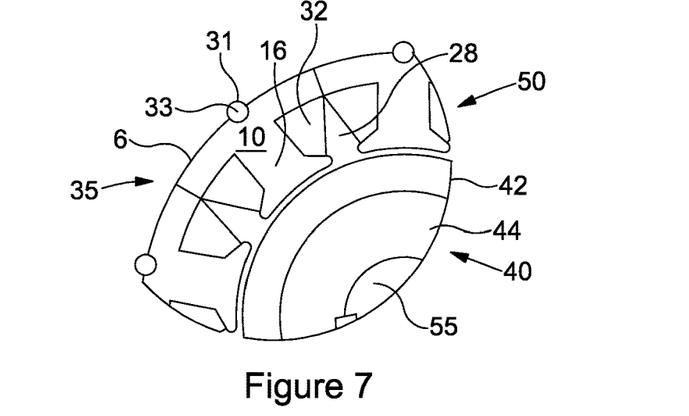
FIG. 7 is a detail sectional view of an electric machine according to an embodiment in which each stator segment comprises a longitudinal cooling channel and including a fluid conduit partially received in the channel.
Figure 8:
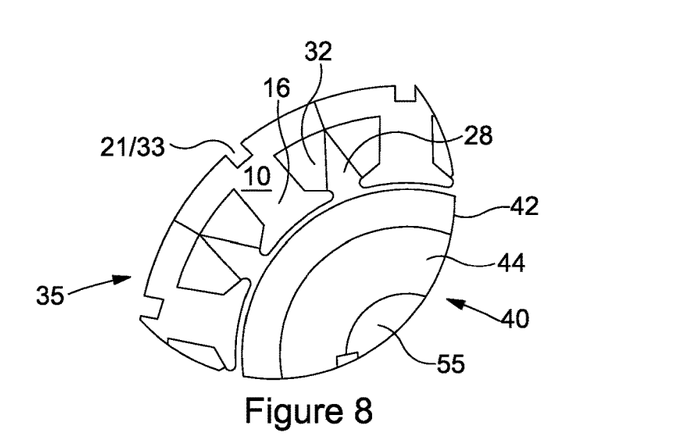
FIG. 8 is a detail sectional view of an electric machine according to an embodiment in which each stator segment comprises a longitudinal cooling channel in the form of a slot in the exterior of the base of each stator segment.

FIG. 7 illustrates an alternative arrangement of cooling channel, in which a fluid conduit or pipe 31 is disposed in a slot 33 in the outer face 6 of each pole segment 10. In this example the slot 33 is semi-circular in cross section, the pipe 31 is substantially circular, and forms a protrusion on the outer face 6 of each pole segment 10. The pipe 31 thereby may form a location feature for preventing relative rotation between the stator 35 and the housing (not shown), FIG. 8 shows a further example in which the stator 35 comprises a plurality of identical pole segments 10, each pole segment 10 having a location feature 21 in the form of a slot with rectangular cross section (suitable for receiving a substantially rectangular key of the housing). At least one location feature 21 may alternatively or additionally be used as a cooling channel 33.

Figure 9:
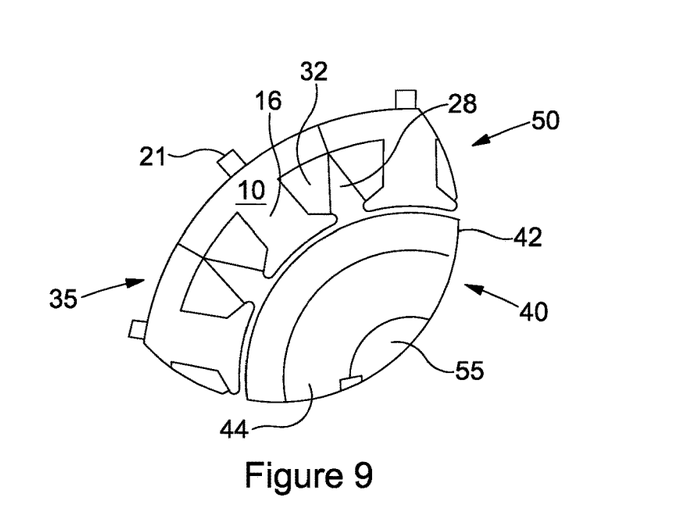
FIG. 9 is a detail sectional view of an electric machine according to an embodiment in which each stator segment comprises a location feature in the form of a ridge.

In FIG. 9 a similar arrangement is shown to FIG. 8, except that the location feature 21 takes the form of a ridge or key with a substantially rectangular cross section.

Figure 10:
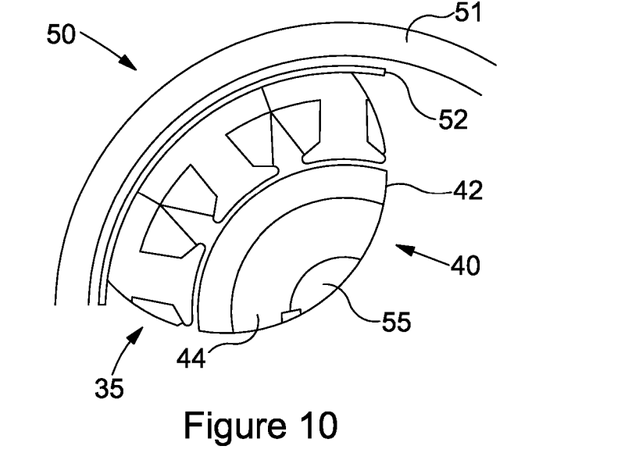
FIG. 10 is a detail sectional view of motor according to an embodiment showing a motor housing.

FIG. 10 illustrates a motor 50, comprising a housing 51, stator 35 and rotor 40. The stator and rotor may include any of the features described herein. The housing 51 may be substantially cylindrical, and a non-conducting layer 52 may be provided between the stator 35 and housing 51, to electrically isolate the stator 35 from the housing 51. Any suitable non-conducting layer may be used, such as a GF-300 silicone elastomer or a suitable plastic material.

The rotor 40 (or stator 35) may comprise an arrangement without a conventional (ferrous) back iron portion 44: instead SMC material may be used instead. Alternatively, a conventional ferrous back iron portion may be used (either in the rotor 40 or stator 35).

Figure 11:
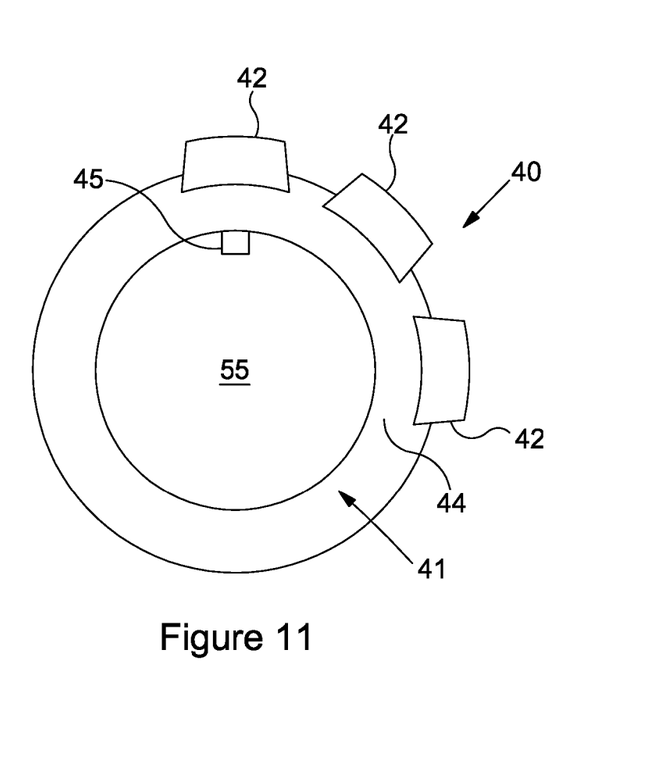
FIG. 11 is a schematic cross sectional view of a rotor according to an embodiment, in which a dovetail cross section magnets are retained in corresponding recesses in the rotor.

FIG. 11 illustrates a rotor 40 according to an embodiment comprising permanent magnets 42, which are each slotted into a corresponding recess in an SMC rotor body 41, which comprises a back iron portion 44. Each recess is a dovetail shape, with sloping sidewalls that retain the magnets 42 radially. The inner surface of the rotor 40 may be provided with a keyway 45 (protrusion or recess) for fixing a shaft circumferentially relative to the rotor.

Figure 12:
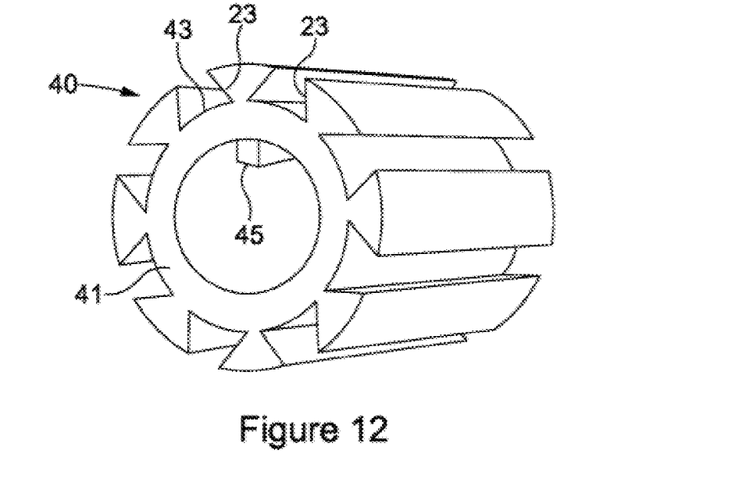
FIG. 12 is an further example view of a rotor having dovetail recesses, each recess for receiving and retaining a magnet.

FIG. 12 illustrates an example rotor 40, also having dovetail recesses 43 for receiving and retaining magnets (not shown). The example is not shown to scale.

The inner surface of the rotor 40 is provided with a keyway 45 having the form of a protrusion (which could, alternatively, be a recess) for fixing a shaft circumferentially relative to a rotor (not shown).

In some embodiments, the rotor 40 may be formed from a plurality of magnet carrying segments, each magnet carrying segment comprising an arcuate base and one or more permanent magnets fixed to the base. The permanent magnets may face inwards (e.g. for use as an external rotor) or outwards (e.g. for use as an internal rotor).

Features previously described with reference to the pole segments may also be applied to magnet carrying segments. Each magnet carrying segment may be formed from an SMC, and may be monolithic (e.g. formed in a single pressing operation, as described with reference to the pole segments).

The permanent magnets may be attached to the magnet carrying segment in any way, for example, adhesive, fasteners, etc. Each magnet carrying segment may comprise one or more recesses, each recess for receiving a permanent magnet. Each recess may comprise tapering sidewalls, having a generally "dovetail" type shape, so that a corresponding shaped magnet is retained radially by the sidewalls of the recess. The recess may be configured to receive a magnet by slotting the magnet into the recess along its length (in a substantially longitudinal direction). Each recess may be skewed relative to the longitudinal direction, for example to reduce cogging.

Each magnet carrying section may comprise a plurality of magnets and corresponding magnet recesses.

The structure shown in FIG. 12 may be employed to assemble magnets on a rotor, e.g. as described above in relation to FIG. 11, or to assemble pole segments into a ring, the pole segments each having a male location feature shaped and dimensioned to be received in one of the dovetail recesses 43.

Figure 13:
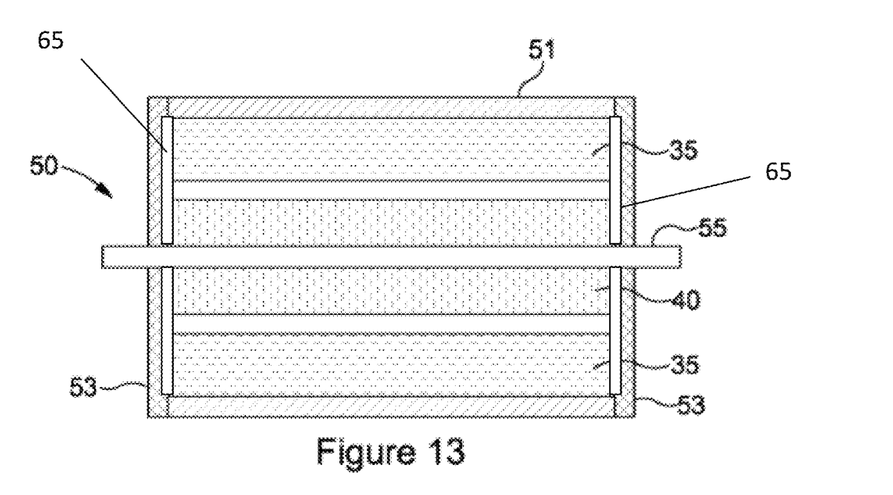
FIG. 13 is a sectional view of a motor according to an embodiment showing a motor housing with end caps, and including the motor shaft.

FIG. 13 shows a further example of a motor 50, comprising a housing 51, end caps 53, stator 35, rotor 40 and shaft 55. The rotor is 40 is fixed to the shaft 55, which may be supported by bearings carried by the end caps 53. In some embodiments the end caps 53 may comprise a non-conducting material, such as an engineering plastic or composite material, for instance polycarbonate, polyamide, acrylonitrile butadiene styrene (ABS), ultra-high molecular weight polyethylene, fibre reinforced polymer (e.g. glass, Kevlar® and/or carbon fibre) etc. Non-conducting end caps 53 may improve the efficiency of the motor 50 by reducing or even eliminating eddy current losses due to the rotor magnets and end windings in the caps 53, and may further eliminate bearing currents, which may otherwise result in premature failure of shaft bearings. Eddy currents in conducting end caps may also arise as a result of inverter related bearing currents.

In addition, the end caps 53 may comprise at least one cap channel 65 and/or pipes configured to connect with the longitudinal cooling channel/s 33 formed in pole segments 10 of the stator 35. The cap channels 65 may comprise at least one lateral (e.g. radial) channel. Each lateral channel may link together multiple longitudinal cooling channels 33. A cooling system for driving a coolant fluid (e.g. liquid) through the longitudinal cooling channels 33 of the stator may be provided, connected to the at least one cap channel.

In some embodiments, identical pole segments 10 may be stacked longitudinally before winding, to extend the longitudinal extent of each pole. The pole segments of the present disclosure therefore may be used to provide a flexible, modular building block of a high performance motor. In other embodiments, complete wound stators may be stacked axially, in a tandem configuration.

The arcuate base of the pole segment may have an inner radius of curvature of at least 10 mm or at least 15 mm. The arcuate base of the pole segment may have an inner radius of curvature of up to 40 mm or up to 50 mm. For example, the arcuate base of the pole segment may have an inner radius of curvature of approximately 27 mm.

The pole segments of the present invention may typically have a maximum width of at least 10 mm or at least 15 mm. The pole segments of the present invention may have a maximum width of up to 40 mm or up to 50 mm. For example, the pole segment may have a maximum width of 30 mm. In some embodiments, the arcuate base may be the widest part of the pole segment.

Typically, the poles may have a length of at least 10 mm or at least 20 mm. The poles may have a length of up to 100 mm, up to 80 mm, up to 60 mm or up to 50 mm.

Motors according to the present disclosure may be particularly suitable for use in hostile environments, particularly when the motor is potted. For example, the motor may be used in a pump, with a potted stator according to this disclosure providing electrical insulation to prevent electrical contact with the fluid of the pump (e.g. water). The approach described herein is also particularly suitable for motors with a low aspect ratio (i.e. pole length in the axial dimension/pole pitch). A short axial length stator may provide additional space within which to accommodate control electronics.

Electric machines, e.g. motors, according to the present invention may also be well suited for use in vehicles, for instance in an automotive vehicle system. Another vehicular application or motors according to the invention is in electric bicycles or e-bicycles (i.e. a bicycle with an integrated electrical motor which can be used for propulsion).

A number of modifications and variations will be apparent to the skilled person, and the foregoing examples are not intended to limit the invention, which should be determined with reference to the appended claims.

The invention claimed is:

1. A stator or rotor for an electric machine, comprising:
a plurality of rings formed of a plurality of pole segments, wherein each pole segment comprises an arcuate base and at least one magnetisable pole extending radially from the arcuate base; and at least one end cap comprising a non-conductive material;
wherein:
the plurality of rings are formed axially of each other;
one or more of the pole segments comprise one or more longitudinal channels extending across the base, wherein the one or more longitudinal channels comprise a closed channel configured to provide a coolant fluid across the base of the one or more pole segments; and
the at least one end cap comprises one or more cap channels for linking in fluid communication with the one or more longitudinal channels of the one or more pole segments.

2. A stator or rotor according to claim 1, wherein the end cap(s) overlie axially one or more of the pole segments in the end ring(s) of the stator or rotor.

3. A stator or rotor according to claim 1, wherein each of the at least one end cap comprises an annular cap or a circular cap.

4. A stator or rotor according to claim 1, wherein the end cap(s) is/are made at least in part from a polymeric material.

5. A stator or rotor according to claim 1, wherein the one or more longitudinal channels comprise an open channel along at least a portion of their length.

6. A stator or rotor according to claim 1, wherein one or more of the pole segments further comprises a pipe disposed at least partially in each of the one or more longitudinal channels.

7. A stator or rotor according to claim 1, wherein the one or more cap channels comprise a lateral cap channel, linking together more than one longitudinal cooling channel.

8. A stator or rotor according to claim 1, wherein the arcuate base extends through 180° of arc, 90° of arc, 72° of arc, 60° of arc, 45° of arc, 36° of arc, 30° of arc, 20° of arc or 15° of arc.

9. A stator or rotor according to claim 1, wherein, in each pole segment, the pole or poles extend radially inwardly or outwardly from the arcuate base.

10. A stator or rotor according to claim 1, wherein each pole segment comprises more than one pole.

11. A stator or rotor according to claim 1, wherein each pole segment comprises a soft magnetic composite material; and/or wherein each pole segment is formed as a single body.

12. A stator or rotor according to claim 1, wherein each pole segment comprises an electrically conducting coil winding around each pole.

13. A stator or rotor according to claim 1, wherein, in each pole segment, the arcuate base is provided with at least one location feature.

14. A stator or rotor according to claim 1, wherein each of the at least one ring is formed of a plurality of substantially identical pole segments.

15. A stator or rotor according to claim 1, wherein the at least one ring is/are disposed within a band, sleeve or housing.

16. An electric machine comprising a stator or rotor, the stator or rotor comprising:
a plurality of rings formed of a plurality of pole segments, wherein each pole segment comprises an arcuate base and at least one magnetisable pole extending radially from the arcuate base; and at least one end cap comprising a non-conductive material;
wherein:
the plurality of rings are formed axially of each other;
one or more of the pole segments comprise one or more longitudinal channels extending across the base, wherein the one or more longitudinal channels comprise a closed channel configured to provide a coolant fluid across the base of the one or more pole segments; and
the at least one end cap comprises one or more cap channels for linking in fluid communication with the one or more longitudinal channels of the one or more pole segments.

* * * * *